United States Patent [19]

Scott

[11] Patent Number: 5,177,392
[45] Date of Patent: Jan. 5, 1993

[54] HIGH EFFICIENCY, LOW REACTANCE DISK-TYPE MACHINE INCLUDING AN IMPROVED ROTOR AND STATOR

[75] Inventor: Dennis J. Scott, Penn Township, Westmoreland County, Pa.

[73] Assignee: Westinghouse Electric Corp., Pittsburgh, Pa.

[21] Appl. No.: 640,752

[22] Filed: Jan. 14, 1991

[51] Int. Cl.⁵ .............................................. H02K 1/22
[52] U.S. Cl. .................................... 310/268; 310/42; 310/43; 310/44; 310/68 B; 310/91; 310/183; 310/184; 310/198; 310/207; 310/208
[58] Field of Search ................ 310/268, 43, 180, 184, 310/114, 198, 208, 207, 182, 183, 197, 202, 42, 179, 261, 254, 71, 112, 44, 91

[56] References Cited

U.S. PATENT DOCUMENTS

| | | | |
|---|---|---|---|
| 3,230,406 | 1/1966 | Henry-Baudot | 310/114 |
| 3,469,134 | 9/1969 | Beyersdorf | 310/268 |
| 3,567,978 | 3/1971 | Parker | 310/268 |
| 3,848,331 | 11/1974 | Pavlik et al. | |
| 3,948,690 | 4/1976 | Pavlik et al. | |
| 4,039,875 | 8/1977 | Morreale | 310/71 |
| 4,237,396 | 12/1980 | Blenkinsop et al. | |
| 4,255,684 | 3/1981 | Mischler et al. | |
| 4,288,709 | 9/1981 | Matthias et al. | |
| 4,327,303 | 4/1982 | Jacobsen | 310/261 |
| 4,392,072 | 7/1983 | Rosenberry | |
| 4,554,491 | 11/1985 | Plunkett | |
| 4,620,120 | 10/1986 | Laing | |
| 4,757,222 | 7/1988 | Shiraki et al. | |
| 5,057,726 | 10/1991 | Mole | 310/114 |

FOREIGN PATENT DOCUMENTS 8912347 12/1989 PCT Int'l Appl. ................. 310/268

OTHER PUBLICATIONS

Article "On the Feasibility and Advantages of Disk-Type Electric Machines", by A. S. Kurbasov printed in *Electric Technology U.S.S.R.* No. 1, pp. 54-62, (no month) 1985; printed in Great Britain by Pergamon Press Ltd., (no month) 1986.

*Primary Examiner*—R. Skudy

[57] ABSTRACT

An improved disk-type machine having a plurality of alternating stator and/or rotor sections is disclosed. The stator of the machine has microlaminated stator teeth molded from cut steel particles, mounted on a large disk of composite fiber material which is the main structural component of each stator section. The stator teeth are preferably molded in place during disk manufacture. The stator is designed to operate in a machine having an even number of axial air gaps, but has only a single winding for each stator. One layer of the winding is located on each side of the central supporting disk and the ends of the windings are connected through connectors molded into or mounted on the disk. Multiturn coils may be employed by making a plurality of these connections for each coil. The interior rotor sections of the machine are likewise constructed on supporting rotor disks of composite material, and have pole pieces molded into place during disk manufacture which are wound on both sides of the supporting disk. The pole pieces have damper slots in their faces for receiving a damper winding. An outer support cylinder at the circumference of the supporting rotor disk structurally supports components of the rotor. Cover pieces are provided at the sides of the rotor sections, facing the stator sections. The structures disclosed produce a practical design with improved efficiency and reactance levels.

59 Claims, 7 Drawing Sheets

HIGH EFFICIENCY, LOW REACTANCE DISK-TYPE MACHINE INCLUDING AN IMPROVED ROTOR AND STATOR

BACKGROUND OF THE INVENTION

Disk-type motors and generators have some important advantages over standard cylindrical machines. These advantages include higher power density and lower noise levels. Ordinary cylindrical-type machines are inherently noisy due to radial flexure of the machine housing. In contrast, disk-type machines are inherently quieter because the housing flexure resulting from the attraction and repulsion forces between the stator and rotor poles is axial. As a result, the ends of the housing of a disk-type machine vibrate due to attraction and repulsion forces, but the cylindrical portion of the housing is much stiffer in the axial direction than in the radial direction so vibration is reduced. In addition it is much easier to isolate axial vibrations from the supporting structure than it is to isolate radial vibrations. In applications where silent electrical machine operation is necessary, such as in submarines, the disk-type motor is particularly advantageous.

However, disk-type designs in the past have suffered from lower efficiency, high reactance, and manufacturing difficulties. Manufacturing complexity results from the fact that stator teeth in prior art designs are laminated in the axial and peripheral directions but are tapered in the radial direction. Thus, each radial layer of punchings must be a slightly different size than the previous layer. In addition, the material between stator teeth that supports the teeth must be of a different material so as to be non-magnetic, non-conducting, and light in weight for maximum efficiency and power density. Accurately pinning all of these separate laminations together to obtain a structurally sound stator assembly is also difficult. The same problems occur in constructing a rotor for such machines.

Disk-type machines with one stator and one rotor have been made in small sizes, as described in U.S. Pat. No. 4,757,222 to Shiraki et al. However, axially directed magnetic forces become prohibitively large in machines of power greater than 100 kilowatts.

These forces can be cancelled in a machine that has at least two axial air gaps, as shown in U.S. Pat. Nos. 4,237,396 to Blenkinsop et al. and 4,288,709 to Matthias et al. This concept is also suggested in the article, "On the Feasibility and Advantages of Disk-Type Electric Machines," by A.S. Kurbasov appearing in Electric Technology U.S.S.R., No. 1, at pages 54-62. A prior art machine of this type is shown in FIG. 1. As shown in FIG. 1, these machines employ two or more stator coils 108. The machine of FIG. 1 includes rotor coils 102 mounted on field poles 103 which are in turn mounted on rotor supports 104 rotating with shaft 106. Stator coils 108 are mounted on stator support disk 110 which is fixed to stator frame 112. Two axial air gaps 114 are defined between stator coils 108 and rotor coils 102. As shown in FIG. 2, such machines may use a composite stator disk 202 with laminated iron teeth 204 arranged to form parallel sided slots 206 therebetween. The disadvantage of these prior art techniques is that the multiple stator windings increase the machine reactance and decrease efficiency, primarily because of the extra sets of stators and the increase in coil end turns required.

Therefore, there is a need for an improved disk-type machine that offers greater efficiency, has lower reactance, and is less expensive and less difficult to manufacture than prior-art disk-type machines.

SUMMARY OF THE INVENTION

Thus, it is a general object of the present invention to provide an improved disk-type electrical machine.

Another general object of the present invention is to provide an improved stator for a disk-type electrical machine.

Yet another general object of the present invention to provide an improved rotor for a disk-type electrical machine.

It is a more specific object of the present invention to provide a novel and improved stator for a disk-type electrical machine which uses micro-laminated stator teeth molded from cut steel particles.

A further object of the present invention is to provide a novel and improved rotor for a disk-type electrical machine which uses micro-laminated teeth molded from cut steel particles.

Another object of the present invention is to provide a novel and improved stator for a disk-type electrical machine in which components are molded into a structural disk of composite fiber material.

It is also an object of the present invention to provide a novel and improved rotor for a disk-type electrical machine in which components are molded into a structural disk of composite fiber material.

Yet another object of the present invention is to provide a novel and improved rotor section for a disk-type motor including a structural support about the circumference of a supporting disk upon which the rotor section is constructed.

Another object of the present invention is to provide a novel and improved rotor section for a disk-type motor including covering means for covering components of the rotor section at the air gap between the rotor section and an adjacent stator section.

A further object of the present invention is to provide a novel and improved stator for a disk-type electrical machine which has a single winding yet operates in a machine having two or more axial air gaps.

Yet another object of the present invention is to provide a novel and improved stator for a disk-type electrical machine in which one layer of a single winding is located on each side of a central supporting disk.

Another object of the present invention is to provide a novel and improved stator for a disk-type electrical machine in which one layer of a single winding is located on each side of a central supporting disk and the ends of the windings and of turns within a given coil are connected by means of connectors passing through the disk.

It is another broad object of the present invention to provide a novel and improved stator coil adapted for use in the improved stator of the present invention.

Another object of the present invention is to provide a novel and improved stator coil in the form of an open ring adapted to mate with connectors on a stator to thereby form a functional coil with complete electrical paths.

These objects and others which will be apparent upon review of the specification and claims are achieved by providing an improved disk type machine including a novel and improved stator and rotor. The interior stator sections of the present invention use micro-laminated stator teeth molded from cut steel particles and mounted on a large disk of composite fiber material which is the main structural component. The stator teeth are either molded separately and mounted in tapered slots in the disk, or are molded in place. In addition, although the stator section of the present invention is designed to operate in a machine having an even number of axial air gaps, it has only a single winding. One layer of the winding is located on each side of the central supporting disk and the ends of the windings are connected through connectors molded into or mounted on the disk. Multiturn coils may be employed by making a plurality of these connections for each coil.

The interior rotor sections of the machine are likewise constructed on supporting rotor disks of composite material, and have pole pieces of cut steel particles molded into place during disk manufacture which are wound on both sides of the supporting disk. The pole pieces have damper slots in their faces for receiving a damper winding. An outer support cylinder at the circumference of the supporting rotor disk structurally supports components of the rotor. Cover pieces are provided at the sides of the rotor sections, facing the stator sections.

The machine disclosed produces a practical design without sacrificing efficiency or reactance levels.

DETAILED DESCRIPTION OF THE PREFERRED EMBODIMENTS

The present invention is an improved electrical disk-type machine which includes an improved rotor and an improved stator.

Figure 1:
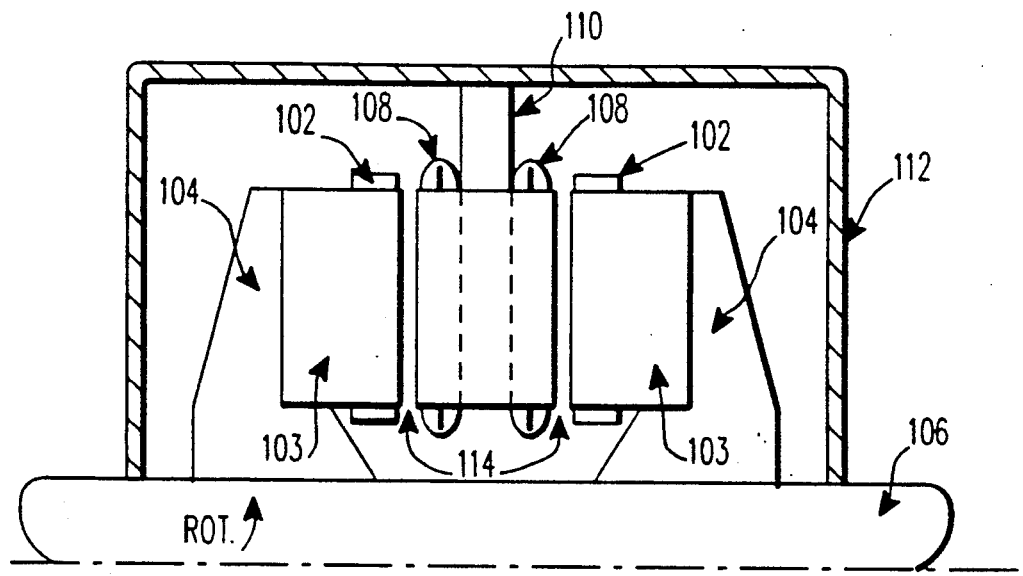
FIG. 1 is a cross-sectional assembly drawing of a prior-art double air gap disk-type machine.
Figure 2:
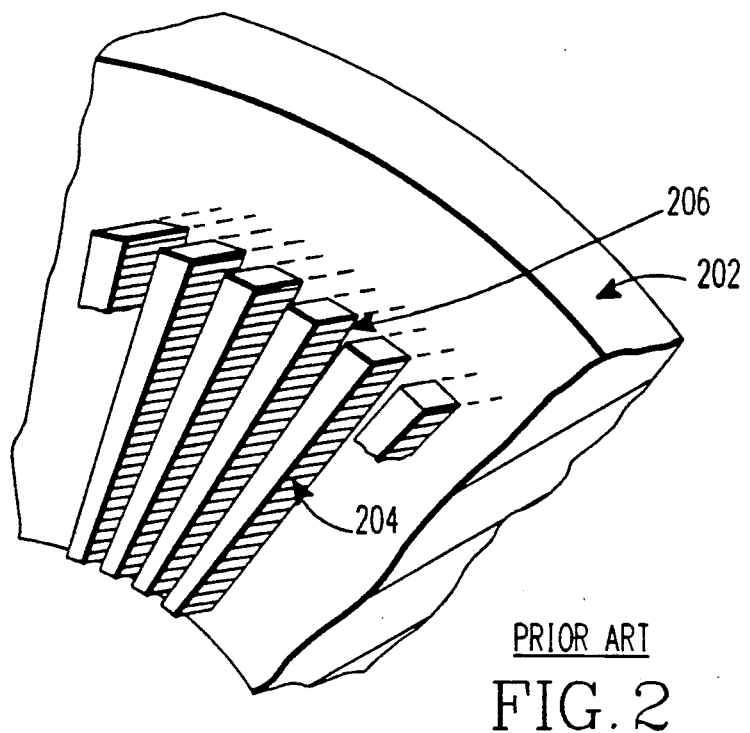
FIG. 2 is an assembly drawing showing a portion of a prior-art stator for a disk-type machine.
Figure 3:
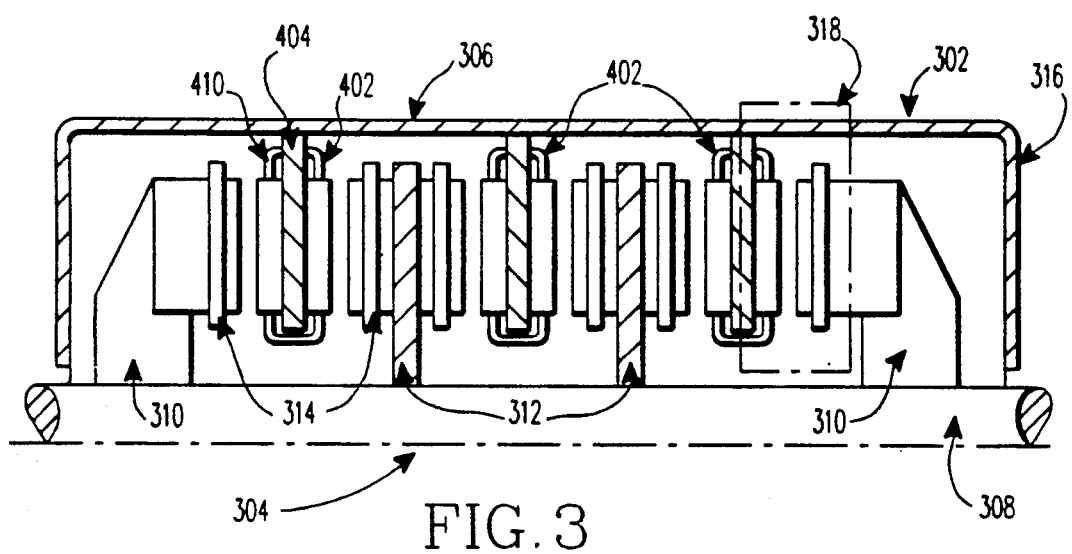
FIG. 3 is a cross-sectional assembly drawing of a disk-type machine according to the present invention.

FIG. 3 illustrates generally a preferred embodiment of the disk-type machine 302 of the present invention. The disk-type machine 302 has a rotating portion 304 and a static portion 306. Rotating portion 304 of disk-type machine 302 comprises shaft 308, two end rotor sections 310, and, optionally, one or more interior rotor sections 312. The interior rotor sections 312 and the end rotor sections 310 are provided with field windings 314. Each of the end rotor sections 310 and the interior rotor sections 312 are fixed to the shaft 308 and rotate with shaft 308 relative to the static portion 306 of disk-type machine 302.

The static portion 306 of the disk-type machine 302 comprises stator frame 316, to which at least one stator section 402 is attached. Each stator section 402 includes stator disk 404 and stator coils 410. The stator disk 404 of each stator section 402 is fixed to the stator frame 316.

End rotor sections 310 are located at opposite ends of the shaft 308. Stator sections 402 and interior rotor sections 312 are alternately mounted between the end rotor sections 310 along the length of shaft 308 so that in all cases a rotor field winding 314 faces each set of stator coils 410. Each pairing of a set of rotor field windings 314 and a set of stator coils 410 forms a primitive machine 318. In the embodiment illustrated, six primitive machines 318 are formed using two end rotor sections 310, three stator sections 402, and two interior rotor sections 312. Any number of primitive machines 318 greater than one can be provided according to the present invention by providing the required number of additional stator sections 402 and/or interior rotor sections 312. A greater number of primitive machines will increase the power rating capability of the disk-type machine 302, but will also increase the weight of disk-type machine 302 and the inertia of rotating portion 304 of disk-type machine 302. Therefore, the number of primitive machines 318 to be included in the design of disk-type machine 302 will depend on the requirements of the particular application of disk-type machine 302.

Figure 4:
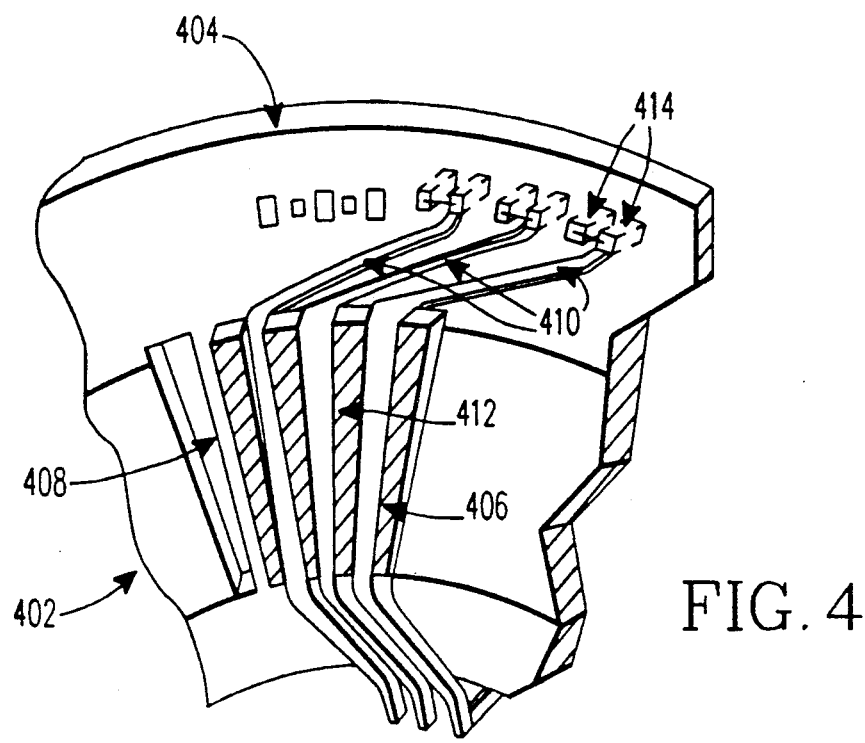
FIG. 4 is an assembly drawing showing one side of a portion of the stator of the present invention with stator teeth and stator coils mounted thereon.

The improved stator section of the present invention will now be described in detail. Referring first to FIG. 4, the stator section of the present invention is shown generally at 402. Only a portion of the stator is shown in the drawing of FIG. 4; the entire stator section 402 is actually in the shape of a circular ring open in the center.

The stator section 402 is constructed on a stator disk 404 which is the main structural component of the stator section 402 and is preferably of composite fiber material. The material should be non-conductive and non-magnetic. Stator teeth 406 are mounted through the stator disk 404 in a generally circular, spaced relationship about the circular stator disk 404. The stator teeth 406 are formed in a wedge shape so that parallel coil seats 412 are formed between adjacent stator teeth 406 on each side of stator disk 404 to accommodate stator coils 410. In the preferred embodiment of the invention, the stator teeth 406 are molded in place when the stator disk 404 is formed, eliminating the need for supporting brackets. Of course, the stator teeth 406 could also be molded separately and mounted in tapered slots 408 provided on stator disk 404. The stator teeth 406 would be retained in slots 408 by supporting brackets (not shown).

It is a particular feature of the present invention that the stator teeth 406 are micro-laminated from cut steel particles using materials and methods similar to those described in U.S. Pat. Nos. 3,848,331 and 3,948,690 to N.H. Pavlik et al., the disclosures of which are incorporated herein by reference. The structure of these stator teeth greatly reduces eddy currents in the stator teeth 406. The use of stator teeth 406 formed in this manner also eliminates substantial difficulties in fabricating and assembling the stator teeth 406. Specifically, the manufacturing complexity that is eliminated by the use of the present method results from the fact that stator teeth in prior art designs are laminated in the axial and peripheral directions but are tapered in the radial direction. Thus, each radial layer of punchings must be a slightly different size than the previous layer. In addition, the material between stator teeth that supports the teeth of prior art designs was required to be of a different material so as to be non-magnetic, non-conducting, and light in weight for maximum efficiency and power density. Accurately pinning all of these separate laminations together to obtain a structurally sound stator assembly was also difficult in the prior art.

Significant improvements over the prior art in the efficiency and reactance levels of the stator section 402 are achieved by using a single stator winding instead of the normally required minimum of two windings. As shown in FIG. 4, this improvement is achieved by locating one layer of windings, i.e. one half of each coil 410, on each side of stator disk 404. The turns of each coil 410 are continuous around the circumference of the coil 410 and are connected through the stator disk 404 by means of connectors 414 which are preferably formed in the stator disk 404. Connection through the stator disk 404 is necessary because the stator disk 404 will preferably be mounted to the stator frame of the machine around the outer circumference of stator disk 404; thus, there will be no clearance to allow the passage of coils 410 around the outer periphery of stator disk 404.

The connectors 414 may in their simplest form comprise copper blocks which are molded into the stator disk 404 during production of stator disk 404. The connectors 414 will each have a provision for attaching either a turn or a start or finish lead of a coil 410 thereto. The conductors of coil 410 may, for example, be connected to a threaded protrusion in connector 414 by means of a nut, or the connectors 414 may be drilled and tapped so that the conductors of coil 410 may be bolted to the connector 414. While the connectors 414 have been described in simple form, those skilled in the art of machine design will recognize that the connectors 414 could be any type of known connector. In addition, the stator disk 404 could be machined after production to accept connectors 414 if molding the connectors 414 into stator disk 404 is not desired. The number of connectors 414 which are provided in stator disk 404 will depend on the number of coils 410 to be provided on the stator disk 404 and the number of turns per coil. In general, one connector 414 will be needed for each coil 410 to facilitate connection of the finish lead of the previous coil 410 to the start lead of the present coil 410. An additional connector 414 will be needed for each turn in excess of one within coil 410. The stator section 402 in FIG. 4 is shown structured for coils 410 having two turns each, so that two connectors 414 are provided for each coil 410. One connector 414 connects the start lead of the coil 410 to the finish lead of the previous coil 410, while the other connector 414 connects the end of the first turn within coil 410 to the beginning of the second turn within coil 410.

In another embodiment of the invention, the stator section 402 could be constructed by merely providing holes passing through the stator disk 404, and then welding or otherwise directly connecting the ends of the coil turns together within these holes. In this embodiment, no special forming of the ends of the coil turns would be needed.

Figure 5:
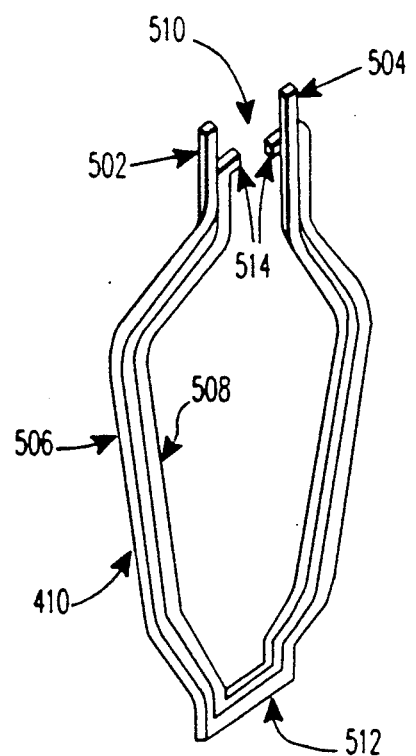
FIG. 5 is a perspective view of a multiturn stator coil according to the present invention.

Referring now to FIG. 5, the coils 410 are constructed generally in accordance with the prior art in that they are made up of loops consisting of twisted bundles of copper wire, each bundle being coated with insulating material to prevent conduction between loops. Each coil 410 has a start lead 502 and a finish lead 504. The coil 410 may be provided with any number of turns. The coil 410 shown in FIG. 5 is provided with two turns, a first turn 506 and a second turn 508. The coil 410 does, however, differ from the prior art in several important respects. The upper end section 510 and the lower end section 512 are elongated to provide clearance for the thickness of stator disk 404 which will lie between the two coil halves. Further, the radially outward end turn at upper end section 510 is cut between the end of first turn 506 and the beginning of second turn 508 after forming of the coil 410 to form connecting points 514, so that the coil 410 can be installed on stator disk 404 (shown in FIG. 4). The coil 410 is mounted on the stator disk 404 by spreading the coil 410 at upper end section 510 and fitting each half of the coil 410 to an appropriate coil slot 412 (shown in FIG. 4) on opposite sides of the stator disk 404 (shown in FIG. 4). The connecting points 514 are then connected through the connectors 414 (shown in FIG. 4). The start lead 502 is connected to the finish lead of the previous coil to be placed in series with the coil 410 being installed. The finish lead 504 of the coil 410 being installed is similarly connected to the start lead of the next coil through a connector 414 (shown in FIG. 4).

Figure 6A:
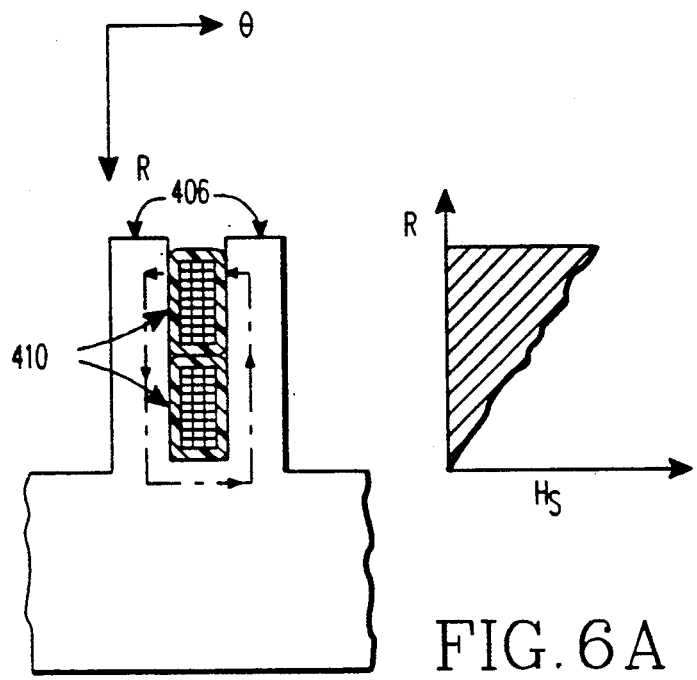
FIG. 6A is a graphical illustration of the slot leakage flux in a typical disk-type machine.

The stator section 402 of the present invention substantially reduces slot leakage reactance as compared to cylindrical machines or conventional disk-type machines. Referring now to FIG. 6, slot leakage flux in a cylindrical machine is compared to the slot leakage flux in a disk-type machine constructed to include the stator section 402 of the present invention. In FIGS. 6A, a cross-section of a portion of a cylindrical machine stator is shown. The flux path in this stator is a loop beginning at the outside end of one stator tooth, passing through this stator tooth to the back iron of the stator, through the back iron to the adjacent stator tooth, through the adjacent stator tooth to its end, and across the slot containing the coil sides to the beginning point of the flux path. As shown in the graph accompanying FIG. 6A the magnetomotive forces $H_s$ tending to cause slot leakage flux increase substantially as R increases, R being a measure of radial distance and phi being a measure of axial distance.

Figure 6B:
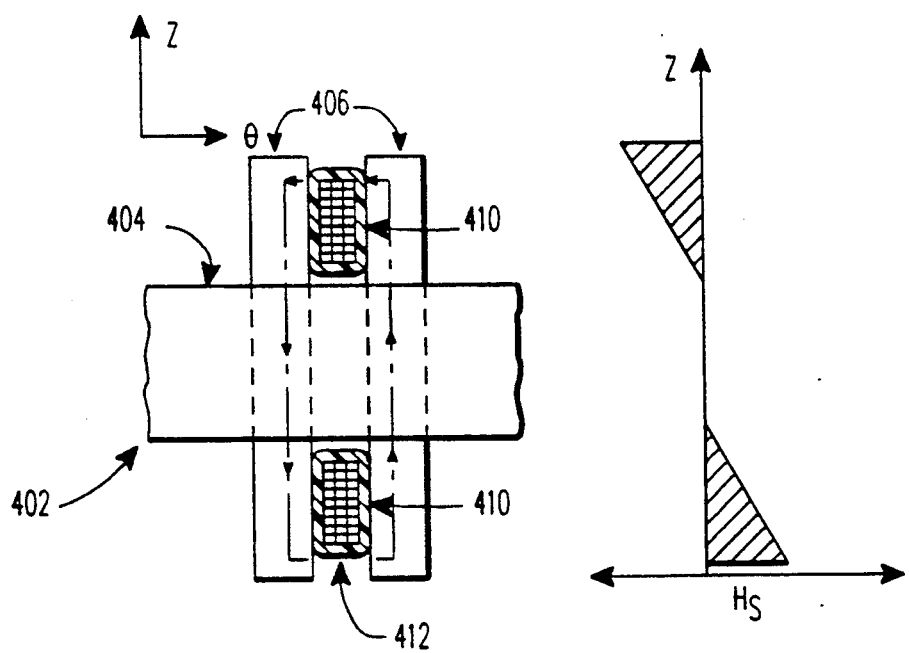
FIG. 6B is a graphical illustration of the slot leakage flux in an improved disk-type machine according to the present invention.

In FIG. 6B, a cross section of a portion of the stator section 402 of the present invention is shown. As shown in FIG. 6B, the flux path in the stator section 402 lies from one end of a first stator tooth 406, through the first stator tooth 406 to the opposite side of stator disk 404, across slot 412 containing coil 410 to a second stator tooth 406 adjacent to the first stator tooth 406, through the second stator tooth 406 to the original side of stator disk 404, and across the slot 412 containing coil 410 to the starting point of the flux path. The graph accompanying FIG. 6B shows the magnetomotive forces $H_s$ tending to cause slot leakage flux in the disk-type machine of the present invention. As can be seen in the graph, these forces are of smaller magnitude than the forces shown in the graph of FIG. 6A, and the forces associated with the disk machine as shown in FIG. 6B also tend to be partially of opposing direction so that there is an offsetting of these forces and Z being a measure of radial distance and phi being a measure of axial distance.

Calculated design parameters for the single-winding disk machine of the present invention are shown in Table 1.

TABLE 1

|  | CYLIND. TYPE | DOUBLE WINDING DISK-TYPE | SINGLE-WINDING DISK-TYPE |
|---|---|---|---|
| Diameter | 80.0 in. (gap) | 103.625 in. (mean) | 117.0 in. (mean) |
| Length | 40.0 in. (axial) | 12.0 in. (radial) | 26.0 in. (radial) |
| # Modules | 1 | 2 | 1 |
| Stator Leakage, XL | 0.14/unit | 0.31/unit | 0.10/unit |
| Stator $I^2R$ Loss | 0.017/unit | 0.021/unit | 0.017/unit |

For comparison, design parameters for a cylindrical machine, and a double-winding disk machine according to the prior art are also shown. The single stator winding design of the present invention retains all the advantages of the double stator winding design except the redundancy inherent in the double winding, yet the present design is more efficient and has lower reactance values.

Figure 7:
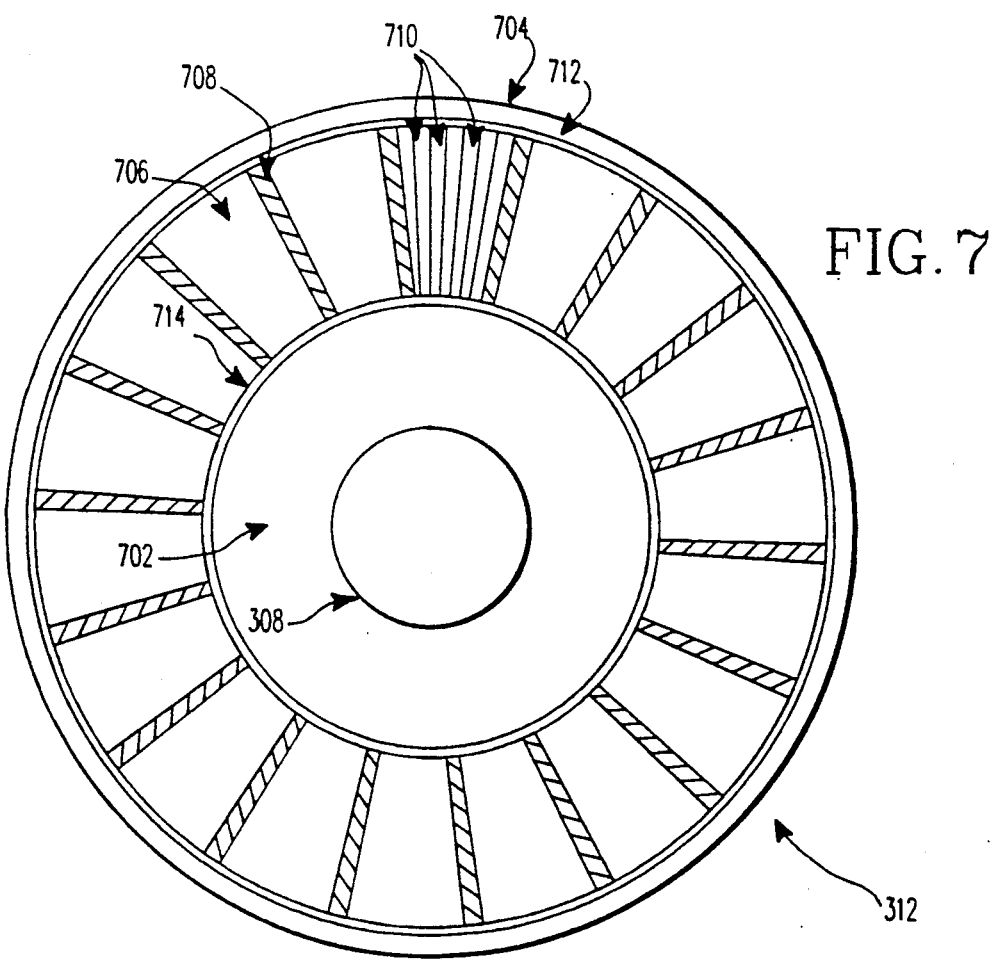
FIG. 7 is an end view of an interior rotor section according to the present invention.

Referring now to FIG. 7, an improved interior rotor section 312 as is preferably used in the machine of the present invention is shown in detail. The interior rotor section 312 of the present invention uses the same general construction techniques as have been described with respect to the stator section 402. The interior rotor section 312 is constructed on a supporting disk 702 which is attached to and rotates with shaft 308. Supporting disk 702 is preferably made of a composite fiber material. Supporting disk 702 is bounded at its circumference by an outer support cylinder 704. Rotor poles 706 are mounted through the supporting disk 702. In this case, 18 rotor poles 706 are shown although another number could be chosen. The rotor poles 706 are separated by interpolar supports 708. Rotor poles 706 are provided with damper slot openings 710. An outer damper shorting ring 712 and an inner damper shorting ring 714 are also mounted on the supporting disk 702 coaxially with the central longitudinal axis of shaft 308, as will be described in detail with reference to FIG. 9.

Figure 8:
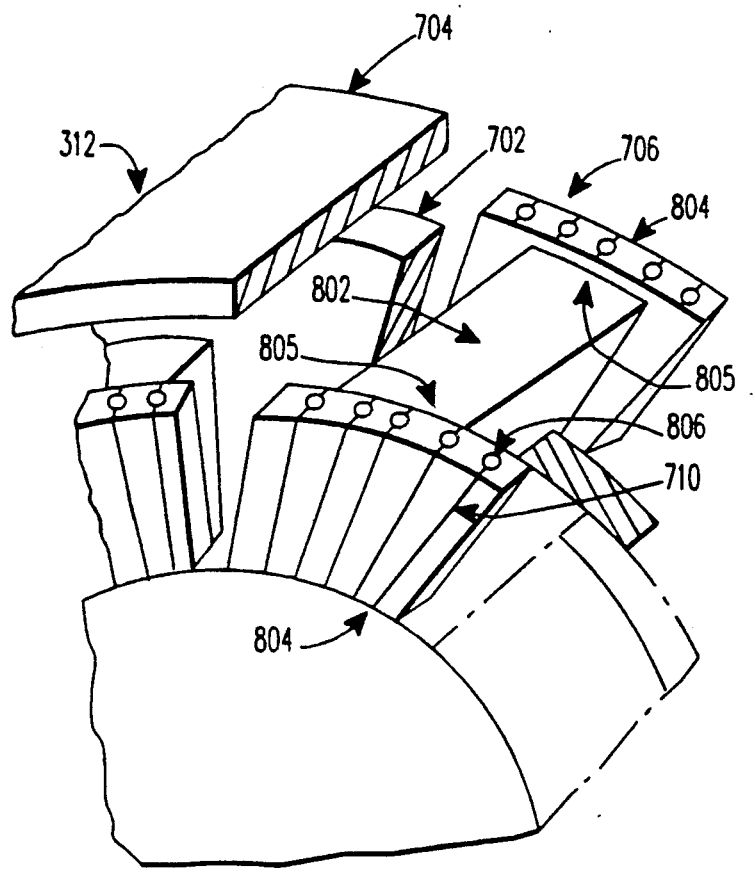
FIG. 8 is a partial assembly drawing of the interior rotor section assembly according to the present invention showing particularly the construction of the rotor poles.

FIG. 8 shows the construction of the rotor poles 706 and their installation in a portion of the interior rotor section 312, assembled in perspective view. The rotor poles are preferably constructed of magnetically conductive cut steel microlaminations in the same manner as described previously for the stator teeth 406 (shown in FIG. 4). As shown, each rotor pole 706 is provided with a central pole body 802 and two pole faces 804. The central pole body 802 passes through the supporting disk 702 and extends beyond the sides of supporting disk 702 to provide rotor winding support areas 805 next to the sides of supporting disk 702. The pole faces 804 are provided with a plurality of damper slots 806. Each damper slot 806 has a damper slot opening 710 for providing access to the damper slot 806.

Rotor poles 706 may be molded into the supporting disk 702 during the construction of the supporting disk 702, or the rotor poles 706 may be mounted to the supporting disk 702 by supporting brackets (not shown).

Figure 9:
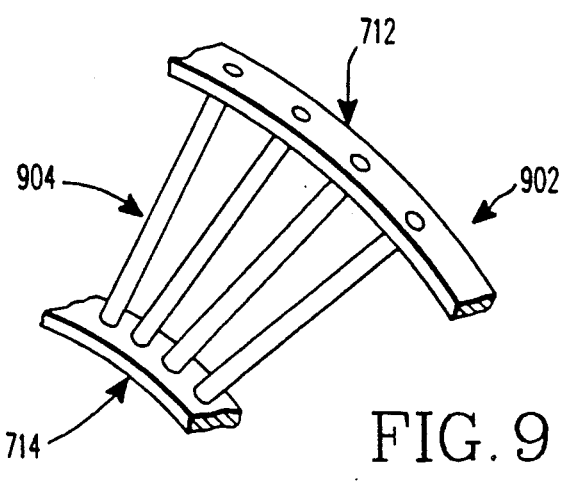
FIG. 9 is a perspective assembly drawing showing the construction of the damper rings and bars of the interior rotor section of the present invention.

FIG. 9 shows a portion of a damper winding 902 adapted for installation on interior rotor section 312. Damper winding 902 comprises outer damper shorting ring 712, inner damper shorting ring 714, and a plurality of damper bars 904 radially mounted to electrically connect the inner damper shorting ring 714 and the outer damper shorting ring 712, thus forming a cage-type damper winding 902. Damper bars 904 are adapted to pass through the damper slots 806 in each pole face 804 of the rotor poles 706 so that a damper winding 902 can be installed on each side of the interior rotor section 312. The outer damper shorting ring 712 and the inner damper shorting ring 714 comprise circular assemblies of conductive metal and are located coaxially with each other and with the central longitudinal axis of shaft 308 (as shown in FIG. 7).

Figure 10:
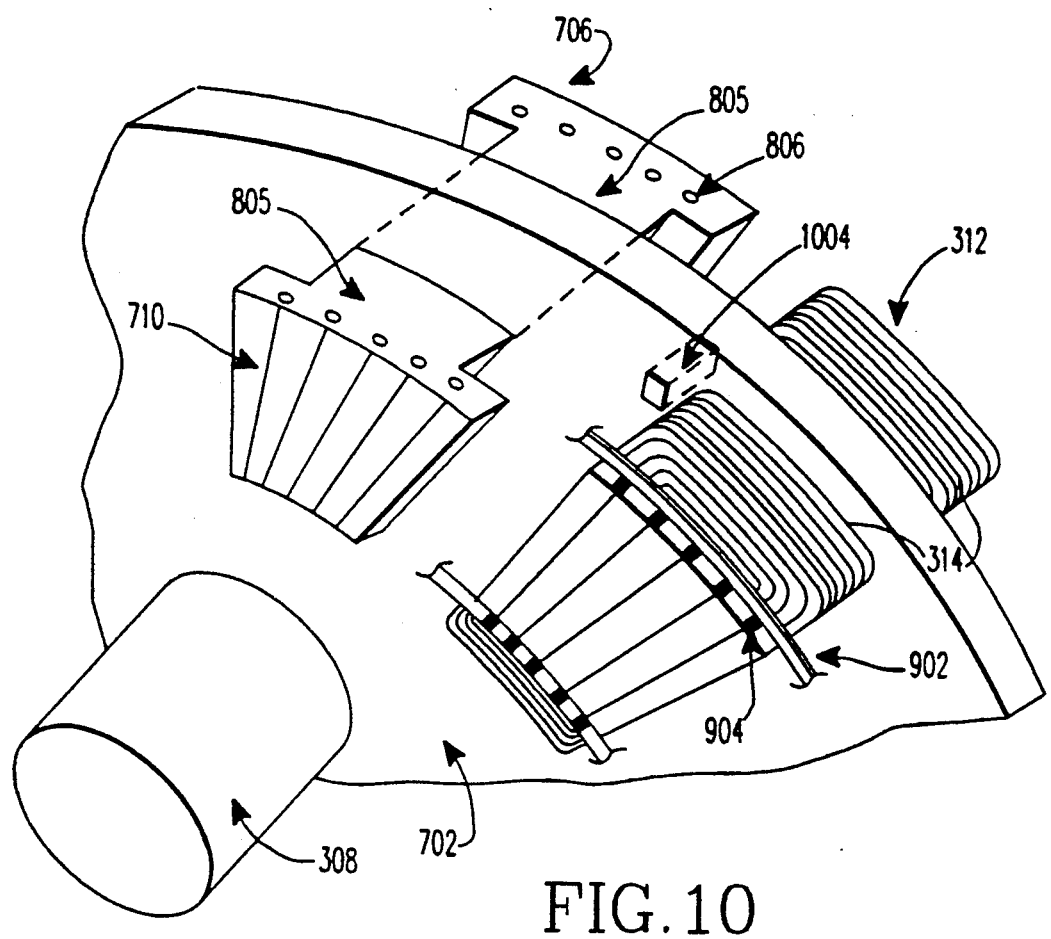
FIG. 10 is an assembly drawing showing part of the interior rotor section of the present invention without an outer support cylinder attached, showing particularly the attachment of the field windings.

FIG. 10 shows a portion of the interior rotor section 312 of the present invention, with field windings 314 installed about rotor poles 706 at rotor winding support areas 805 of rotor poles 706. Two field windings 314 are provided for each rotor pole 706 of the interior rotor section 312, with one field winding 314 mounted on each side of supporting disk 702. The field windings 314 may be connected as required through the supporting disk 702 with connectors 1004 using the connecting methods described for the stator portion 402 with reference to FIG. 4. Specifically, the connectors 1004 may in their simplest form comprise copper blocks which are molded into the supporting disk 702 during production of supporting disk 702. The connectors 1004 may be located wherever appropriate in the supporting disk 702 and will each have a provision for attaching a lead of a field winding 314 thereto. The lead of field winding 314 may, for example, be connected to a threaded protrusion in connector 1004 by means of a nut, or the connectors 1004 may be drilled and tapped so that a lead may be bolted to the connector 1004. While the connectors 1004 have been described in simple form, those skilled in the art of machine design will recognize that the connectors 1004 could be any type of known connector. In addition, the supporting disk 702 could be machined after production to accept connectors 1004 if molding the connectors 1004 into supporting disk 702 is not desired.

Also shown in FIG. 10 is the installation of damper winding 902, with the damper bars 904 running through damper slots 806 of the rotor pole 706. While only a portion of one damper winding 902 is shown, it will be understood that a damper winding 902 is provided on each side of the interior rotor section 312 and that the damper windings 902 each form a complete circle, with the damper windings 902 being mounted in the damper slots 806 of each rotor pole 706.

Figure 11:
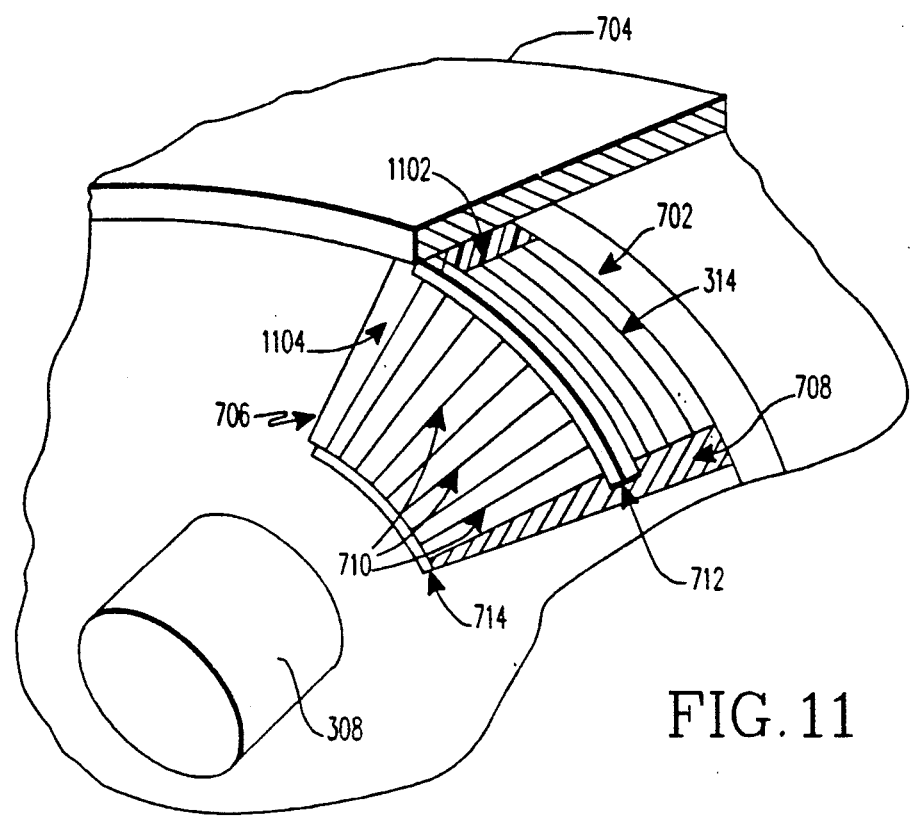
FIG. 11 is a partial assembly drawing of the interior rotor section assembly according to the present invention showing particularly the structural support features of the interior rotor section.

FIG. 11 shows the supporting structural members which may be added to the interior rotor section 312. Interpolar supports 708 may be placed between adjacent rotor poles 706 to provide lateral bracing for the field windings 314 as the interior rotor section 312 rotates. These interpolar supports 708 should be constructed of insulating material.

The outer support cylinder 704 is mounted to the circumferential edge of the supporting disk 702 to support the field windings 314 in the radial direction during rotation of the interior rotor section 312. Insulation 1102 is molded between the field windings 314 and the outer support cylinder 704. The outer support cylinder 704 will preferably be constructed from a lightweight yet structurally strong non-conductive material, such as a plastic or a composite fiber material A cover disk 1104 may be provided at each side of supporting disk 702 to cover pole faces 804 of rotor poles 706 and thus provide axial support for the components of interior rotor section 312 that are attached to the sides of supporting disk 702. The cover disk 1104 is preferably a thin coating of plastic, composite fiber, or another non-conductive material. The cover disk 1104 can be molded in place after assembly of the interior rotor section 312, or the cover disk 1104 can be a removable part attached to each side of interior rotor section 312. In addition to providing structural support, the cover disk 1104 improves the aerodynamics of the interior rotor section 312.

Referring again to FIG. 3, the end rotor sections 310 may be conventional, or more preferably the end rotor sections 310 may be constructed in a manner similar to that described for interior rotor sections 312. Naturally, end rotor sections 310 will differ from interior rotor sections 312 in that they will be provided with field windings 314 and associated components on only the side that faces a stator section 402.

Figure 12:
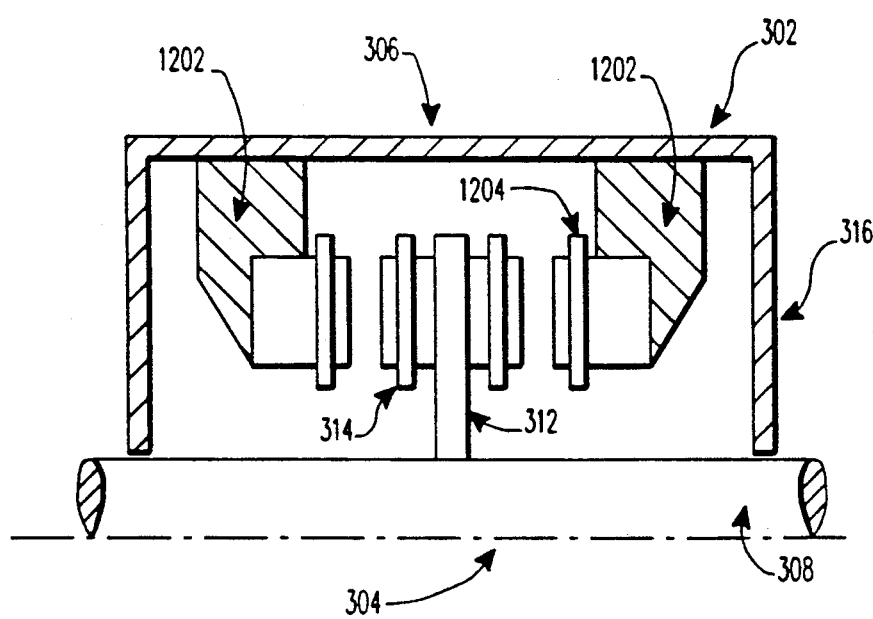
FIG. 12 is a sectional assembly drawing of an alternative embodiment of the disk-type machine of FIG. 3.

Finally, referring to FIG. 12, although the disk-type machine 302 of the present invention has been shown with end rotor sections 310 being at the ends of the shaft 308 (see FIG. 3), it will be apparent to those skilled in the art that in all the embodiments of the present invention end stator sections 1202 could be provided at the ends of shaft 308 in lieu of the end rotor sections 310. In this case, the end stator sections 1202 might be provided with coils on only one side thereof and interior rotor sections 312 would be placed adjacent to the end stator sections 1202 on the shaft 308. If more than two, i.e. four, six, eight, etc. primitive machines are to be constructed in disk-type machine 302, the interior rotor sections 312 will be alternated along the shaft 308 with stator sections 402 as described previously with reference to FIG. 4, similar to the illustration of FIG. 3.

End stator sections 1202 could be constructed conventionally or, more preferably, may be constructed in accordance with the stator designs described herein. However, in the embodiment shown in FIG. 12, there is no need for the coils 1204 of the end stator sections 1202 to pass through a supporting disk, so that the end stator sections 1202 can be simplified relative to the stator sections 402 described previously with reference to FIG. 4.

STATEMENT OF INDUSTRIAL APPLICABILITY

The present invention is a disk-type electrical motor or generator including an improved stator and an improved rotor. Among other applications, this machine can be constructed in large scale and used for submarine propulsion and power generation.

I claim:

1. An improved disk-type electrical machine comprising:
   a shaft operable to rotate;
   two end stator sections each fixed relative to a rotation of the shaft and carrying stator coils;
   wherein each of the stator sections includes a stator supporting means for holding components of the stator section and is nonconductive of electricity and nonmagnetic and having two sides,
   a plurality of stator flux transmitting means passing through the stator supporting means for transmitting magnetic flux between the two sides of the stator supporting means, said stator flux transmitting means protruding from the stator supporting means on each side thereof so as to define slot regions between adjacent pairs of flux transmitting means; and
   a plurality of coil means connected to form a single winding, wherein each coil means includes a layer placed in a slot region at each of the two sides of the stator supporting means;
   at least one interior rotor section rotating with the shaft, comprising:
   rotor supporting means for holding components of the interior rotor section, said rotor supporting means being nonconductive of electricity and nonmagnetic and having two sides;
   a plurality of rotor flux transmitting means passing through the rotor supporting means for transmitting magnetic flux between the two sides of the rotor supporting means, said flux transmitting means protruding from the rotor supporting means on each side thereof so as to define coil regions about which rotor field windings are wound; and
   a stator connecting means attached to the stator supporting means for electrically connecting portions of each coil means on one side of the stator supporting means to portions of a coil means on another side of the supporting means;
   wherein each coil means includes a start lead and a finish lead for connecting the coil means to other components, wherein the electrical connections made by the stator connecting means include connections of the finish lead of one of the plurality of coil means to the start lead of another of the plurality of coil means which is to be connected in series therewith.

2. The machine of claim 1 having at interior rotor sections and further including at least one stator section, the stator section being located between two interior rotor sections.

3. The machine of claim 1 wherein the stator flux transmitting means are stator teeth constructed from micro-laminated cut steel particles.

4. The machine of claim 1 wherein the stator supporting means is a stator disk of composite fiber material.

5. The machine of claim 4 wherein the stator flux transmitting means are stator teeth which are molded into the stator supporting means during manufacture thereof.

6. The machine of claim 5 wherein the stator teeth are constructed from micro-laminated cut steel particles.

7. The machine of claim 1 wherein the stator connecting means pass through the stator supporting means.

8. The machine of claim 1 wherein the coil means includes a plurality of coil turns, and electrical connections made by the stator connecting means include connections between said turns within the coil means.

9. The machine of claim 7 wherein the stator connecting means are molded into the stator supporting means during the manufacture thereof.

10. The machine of claim 9 wherein the stator connecting means comprise blocks of copper material which are provided with means for attaching conductors of the coil means thereto.

11. The machine of claim 1 wherein the stator supporting means is a substantially circular ringlike disk having a circular, radially inward edge and a circular, radially outward edge, and wherein the stator connecting means are spaced about the radially outward edge of the supporting means to make necessary electrical connections of the coil means from one side of the stator supporting means to the other side of the stator supporting means at the radially outward edge of the stator supporting means.

12. The machine of claim 11 wherein the coil means are continuously constructed in the region of the radially inward edge of the stator supporting means and are mounted so as to pass from one side of the stator supporting means, around the radially inward edge of the stator supporting means, and thus to the other side of the stator supporting means.

13. The machine of claim 2 wherein the rotor flux transmitting means are rotor poles constructed from micro-laminated cut steel particles.

14. The machine of claim 2 wherein the rotor supporting means is a rotor disk of composite fiber material.

15. The machine of claim 14 wherein the rotor flux transmitting means are rotor poles which are molded into the rotor supporting means during manufacture thereof.

16. The machine of claim 15 wherein the rotor poles are constructed from micro-laminated cut steel particles.

17. The machine of claim 2 further including rotor connecting means attached to the rotor supporting means for electrically connecting circuit elements on one side of the rotor supporting means to circuit elements on the other side of the rotor supporting means.

18. The machine of claim 19 wherein the rotor connecting means pass through the rotor supporting means.

19. The machine of claim 18 wherein the rotor connecting means are molded into the rotor supporting means during the manufacture thereof.

20. The machine of claim 19 wherein the rotor connecting means comprise blocks of copper material which are provided with means for attaching conductors thereto.

21. The machine of claim 14 wherein the rotor supporting means includes a substantially circular ringlike disk having a circular, radially inward edge and a circular, radially outward edge, wherein the radially inward edge is adapted for connection to a shaft.

22. The machine of claim 21 wherein the rotor supporting means further includes cylindrical ring means at said radially outward edge for providing a centripetal force to hold components of the rotor section stationary with respect to the rotor section during rotation of the rotor section.

23. The machine of claim 22 wherein the cylindrical ring means is a cylindrical rim joined to the radially outward edge of the supporting means at points in a plane perpendicular to and bisecting the central longitudinal axis of the cylindrical rim.

24. The machine of claim 22 wherein the cylindrical ring means is constructed of composite fiber material.

25. The machine of claim 2 wherein the rotor flux transmitting means are rotor poles having a pole body passing through the rotor supporting means and two pole faces at the ends of the pole body, said pole faces being provided with damping means for controlling reactances and time constants in the machine.

26. The machine of claim 25 wherein the pole faces on at least one side of the rotor supporting means are providing with damper slots adapted to receive damper bars.

27. The machine of claim 26 wherein at least one damper winding is provided for a side of the rotor supporting means, comprising an outer damper shorting ring, an inner damper shorting ring, and damper bars adapted to fit in the damper slots of the pole faces.

28. The machine of claim 2 wherein the rotor section further includes a non-magnetic, non-conductive cover means for covering components on at least one side of the rotor supporting means.

29. The machine of claim 2 wherein the rotor section further includes a non-magnetic, non-conductive cover means for providing additional structural support to components on at least one side of the rotor supporting means.

30. The machine of claim 28 wherein the cover means is molded over the side of the rotor section following mounting of components on the side of the rotor supporting means.

31. The machine of claim 29 wherein the cover means is molded over the side of the rotor section following mounting of components on the side of the rotor supporting means.

32. A stator section for a disk-type electrical machine comprising:
   supporting means for holding components of the stator section, said supporting means being nonconductive of electricity and nonmagnetic and having two sides;
   a plurality of flux transmitting means passing through the supporting means for transmitting magnetic flux between the two sides of the supporting means, said flux transmitting means protruding from the supporting means on each side thereof so as to define slot regions between adjacent pairs of transmitting means;
   a plurality of coil means connected to form a single winding;
   wherein each said coil means includes a layer placed in a slot region of each of the two sides of the supporting means;
   a connecting means attached to the supporting means for electrically connecting portions of each said coil means on one side of the supporting means to portions of a coil means on an other side of the supporting means; and
   wherein each coil means includes a start lead and a final lead for connecting the coil means to other components, wherein the electrical connections made by the connecting means include connections to the finish lead of one of the plurality of coil means to the start lead of another coil means which is to be connected in series therewith.

33. The stator section of claim 32 wherein the flux transmitting means are stator teeth constructed from micro-laminated cut steel particles.

34. The stator section of claim 32 wherein the supporting means is a stator disk of composite fiber material.

35. The stator section of claim 34 wherein the flux transmitting means are stator teeth which are molded into the supporting means during manufacture thereof.

36. The stator section of claim 35 wherein the stator teeth are constructed from micro-laminated cut steel particles.

37. The stator section of claim 32 wherein the connecting means pass through the supporting means.

38. The stator section of claim 32 wherein the coil means includes a plurality of coil turns, and electrical connections made by the connecting means include connections between said turns within the coil means.

39. The stator section of claim 37 wherein the connecting means are molded into the supporting means during the manufacture thereof.

40. The stator section of claim 39 wherein the connecting means comprise blocks of copper material which are provided with means for attaching conductors of the coil means thereto.

41. The stator section of claim 32 wherein the supporting means is a substantially circular ringlike disk having a circular, radially inward edge and a circular, radially outward edge, and wherein the connecting means are spaced about the radially outward edge of the supporting means to make necessary electrical connections of the coil means from one side of the supporting means to the other side of the supporting means at the radially outward edge of the supporting means.

42. The stator section of claim 41 wherein the coil means are continuously constructed in the region of the radially inward edge of the supporting means and are mounted so as to pass from one side of the supporting means, around the radially inward edge of the supporting means, and thus to the other side of the supporting means.

43. A rotor section for a disk-type electrical machine comprising:
   supporting means for holding components of the rotor section, said supporting means being nonconductive of electrically and nonmagnetic and having two sides;
   a plurality of flux transmitting means passing through the supporting means for transmitting magnetic flux between the two sides of the supporting means, said flux transmitting means protruding from the supporting means on each side thereof so as to define coil regions about which rotor field winding are wound;
   wherein the supporting means is a rotor disk of composite fiber material and the flux transmitting means are rotor poles constructed from microlaminated cut steel particles which are molded into the supporting means during manufacture thereof.

44. The rotor section of claim 43 wherein the flux transmitting means are rotor poles constructed from micro-laminated cut steel particles.

45. The rotor section of claim 43 further including connecting means attached to the supporting means for electrically connecting circuit elements on one side of the supporting means to circuit elements on another side of the supporting means.

46. The rotor section of claim 45 wherein the connecting means pass through the supporting means.

47. The rotor section of claim 46 wherein the connecting means are molded into the supporting means during manufacture thereof.

48. The rotor section of claim 45 wherein the connecting means comprise blocks of copper material which are provided with means for attaching conductors thereto.

49. The rotor section of claim 43 wherein the supporting means includes a substantially circular ringlike disk having a circular, radially inward edge and a circular, radially outward edge, wherein the radially inward edge is adapted for connection to a shaft.

50. The rotor section of claim 49 wherein the supporting means further includes cylindrical ring means at said radially outward edge for providing a centripetal force to hold components of the rotor section stationary with respect to the rotor section during rotation of the rotor section.

51. The rotor section of claim 50 wherein the cylindrical ring means is a cylindrical rim joined to the radially outward edge of the supporting means at points in a plane perpendicular to and bisecting the central longitudinal axis of the cylindrical rim.

52. The rotor section of claim 50 wherein the cylindrical ring means is constructed of composite fiber material.

53. The rotor section of claim 43 wherein the flux transmitting means are rotor poles having a pole body passing through the supporting means and two pole faces at the ends of the pole body.

54. The rotor section of claim 53 wherein the pole faces on at least one side of the supporting means are provided with damper slots adapted to receive damper bars.

55. The rotor section of claim 54 wherein at least one damper winding is provided for a side of the supporting means, comprising an outer damper shorting ring, an inner damper shorting ring, and damper bars adapted to fit in the damper slots of the pole faces.

56. The rotor section of claim 43 wherein the rotor section further includes a non-magnetic, nonconductive cover means for covering components on at least one side of the supporting means.

57. The rotor section of claim 43 wherein the rotor section further includes a non-magnetic, nonconductive cover means for providing additional structural support to components on at least one side of the supporting means.

58. The rotor section of claim 56 wherein the cover means is molded over a side of the rotor section following mounting of components on the side of the supporting means.

59. The rotor section of claim 57 wherein the cover means is molded over a side of the rotor section following mounting of components on the side of the supporting means.

* * * * *